(12) United States Patent
Focke et al.

(10) Patent No.: US 7,591,003 B2
(45) Date of Patent: Sep. 15, 2009

(54) SECURITY POLICIES IN TRUSTED OPERATING SYSTEM

(75) Inventors: Michael W. Focke, Oakton, VA (US); James E. Knoke, Vienna, VA (US); Paul A. Barbieri, Ashburn, VA (US); Robert D. Wherley, Middletown, MD (US); John G. Ata, Sterling, VA (US); Dwight B. Engen, Herndon, VA (US)

(73) Assignee: BAE Systems Enterprise Systems Incorporated, McLean, VA (US)

( * ) Notice: Subject to any disclaimer, the term of this patent is extended or adjusted under 35 U.S.C. 154(b) by 0 days.

(21) Appl. No.: 11/512,174

(22) Filed: Aug. 30, 2006

(65) Prior Publication Data

US 2007/0056036 A1 Mar. 8, 2007

Related U.S. Application Data

(62) Division of application No. 10/462,771, filed on Jun. 17, 2003, now Pat. No. 7,103,914.

(60) Provisional application No. 60/388,738, filed on Jun. 17, 2002.

(51) Int. Cl.
*H04L 9/00* (2006.01)
(52) U.S. Cl. .................. 726/1; 713/164; 726/22
(58) Field of Classification Search .......... 713/164; 726/1, 22
See application file for complete search history.

(56) References Cited

U.S. PATENT DOCUMENTS

| | | | |
|---|---|---|---|
| 5,230,069 A | 7/1993 | Brelsford et al. ............ 718/100 |
| 5,263,147 A | 11/1993 | Francisco et al. ............ 711/164 |
| 5,504,814 A | 4/1996 | Miyahara ..................... 713/200 |
| 5,521,849 A | 5/1996 | Adelson et al. ............. 702/119 |
| 5,603,014 A | 2/1997 | Woodring et al. ............. 703/22 |
| 5,628,017 A | 5/1997 | Kimmerly et al. ........... 717/127 |
| 5,692,124 A * | 11/1997 | Holden et al. .................. 726/2 |
| 6,182,218 B1 | 1/2001 | Saito ........................... 713/176 |
| 6,490,626 B1 | 12/2002 | Edwards et al. ............. 709/229 |
| 6,496,847 B1 | 12/2002 | Bugnion et al. ................ 718/1 |

(Continued)

OTHER PUBLICATIONS

Biba, K.J., "Integrity Considerations for Secure Computer Systems," Apr. 1977, The Mitre Corporation, Bedford, Massachusetts (Contract No. F19628-75-C-0001).

(Continued)

*Primary Examiner*—Jacob Lipman
(74) *Attorney, Agent, or Firm*—Greenberg Traurig LLP (57) ABSTRACT

A trusted computer system that offers Linux® compatibility and supports contemporary hardware speeds. It is designed to require no porting of common applications which run on Linux, to be easy to develop for, and to allow the use of a wide variety of modern development tools. The system is further designed to meet or exceed the Common Criteria EAL-5 or higher rating through incorporation of required security features, as well as a very high level of assurance for handling data at a wide range of sensitivity (e.g., classification) levels in a wide range of operational environments. This is achieved through the implementation of a well-layered operating system which has been designed from the ground up to enforce security, but which also supports Linux operating system functions and methods.

17 Claims, 4 Drawing Sheets

U.S. PATENT DOCUMENTS 6,782,424 B2    8/2004  Yodaiken .................... 709/224

OTHER PUBLICATIONS

Department of Defense Standard, "Department of Defense Trusted Computer System Evaluation Criteria," Dec. 26, 1985.

The Mitre Corporation, Bedford, Massachusetts, "Secure Computer System: Unified Exposition and Multics Interpretation," Mar. 1976.

"Technical Rational Behind CSC-STD-003-85: Computer Security Requirements—Guidance for Applying the Department of Defense Trusted Computer System Evaluation Criteria in Specific Environments," Jun. 25, 1985.

* cited by examiner

| | A1 | B3 | B2 | B1 | C2 | C1 |
|---|---|---|---|---|---|---|
| DISCRETIONARY ACCESS CONTROL (DAC) | ▨ | | | ▨ | ▨ | ▨ |
| OBJECT REUSE | | | | ▨ | ▨ | |
| LABELS | | | ▨ | ▨ | | |
| LABEL INTEGRITY | | | | ▨ | | |
| EXPORT OF LABELED INFORMATION | | | | ▨ | | |
| EXPORT TO MULTILEVEL DEVICES | | | | ▨ | | |
| EXPORT TO SINGLE-LEVEL DEVICES | | | | ▨ | | |
| LABELING OF HUMAN-READABLE OUTPUT | | | | ▨ | | |
| MANDATORY ACCESS CONTROL (MAC) | | | ▨ | ▨ | | |
| SUBJECT SENSITIVITY LABELS | | | ▨ | | | |
| DEVICE LABELS | | | ▨ | | | |
| IDENTIFICATION & AUTHENTICATION (I&A) | | | | ▨ | ▨ | ▨ |
| AUDIT | | ▨ | ▨ | ▨ | ▨ | |
| TRUSTED PATH | | ▨ | ▨ | ▨ | | |
| SYSTEM ARCHITECTURE | ▨ | ▨ | ▨ | ▨ | ▨ | |
| SYSTEM INTEGRITY | | | | | | ▨ |
| SECURITY TESTING | ▨ | ▨ | ▨ | ▨ | ▨ | ▨ |
| DESIGN SPECIFICATION AND VERIFICATION | ▨ | ▨ | ▨ | ▨ | | |
| COVERT CHANNEL ANALYSIS | ▨ | ▨ | ▨ | | | |
| TRUSTED FACILITY MANAGEMENT | | ▨ | ▨ | | | |
| CONFIGURATION MANAGEMENT | ▨ | ▨ | | ▨ | | |
| TRUSTED RECOVERY | | ▨ | | | | |
| TRUSTED DISTRIBUTION | ▨ | | | | | |
| SECURITY FEATURES USER'S GUIDE | | | | | | ▨ |
| TRUSTED FACILITY MANUAL | | ▨ | ▨ | | | ▨ |
| TEST DOCUMENTATION | ▨ | | ▨ | | | ▨ |
| DESIGN DOCUMENTATION | ▨ | ▨ | ▨ | | | ▨ |

Categories (right side): DOCUMENTATION, ASSURANCE, ACCOUNTABILITY, SECURITY POLICY Legend:
- ☐ NO ADDITIONAL REQUIREMENTS FOR THIS CLASS
- ▨ NEW OR ENHANCED REQUIREMENTS FOR THIS CLASS
- ▩ NO REQUIREMENTS FOR THIS CLASS

FIG. 1

| | MAXIMUM DATA SENSITIVITY | | | | | | |
|---|---|---|---|---|---|---|---|
| | U | N | C | S | TS | 1C | MC |
| U | C1 | B1 | B2 | B3 | NA | NA | NA |
| N | C1 | C2 | B2 | B2 | A1 | NA | NA |
| C | C1 | C2 | C2 | B1 | B3 | A1 | NA |
| S | C1 | C2 | C2 | C2 | B2 | B3 | A1 |
| TS (B1) | C1 | C2 | C2 | C2 | C2 | B2 | B3 |
| TS (SBI) | C1 | C2 | C2 | C2 | C2 | B1 | B2 |
| 1C | C1 | C2 | C2 | C2 | C2 | C2 | B1 |
| MC | C1 | C2 | C2 | C2 | C2 | C2 | C2 |

(Row labels: MINIMUM CLEARANCE/AUTHORIZATION)

| | |
|---|---|
| CPU TYPE | PENTIUM IV CLASS PROCESSOR |
| MAX NUMBER OF CPUs | 2 |
| MEMORY | 2GBYTES PHYSICAL, 4GB PER PROCESS VIRTUAL |
| SCSI | HIGH SPEED SCSI-160 INITIALLY, SCSI-320 PLANNED 15,000RPM DRIVES (18.4 TO 36.4GB) |
| HARD DISK TRANSER SPEED | 160-320MB/sec |
| HARD DISK ROTATION SPEED | 15,000 RPM |
| HARD DISK SIZE | 18.2GB STANDARD; UPGRADEABLE TO 36.4GB |
| VIDEO | SVGA VIDEO |
| NETWORKING | DUAL-MODE 10BASET/100BASET ETHERNET NETWORK |
| FILE SYSTEM | FAST FILE SYSTEM |
| TAPE DRIVE | 12/24GB DDS-3 |
| CASE CONFIGURATIONS | STANDARD TOWER, RACK-MOUNT |
| OTHER PERIPHERALS | • SVGA VIDEO. STANDARD MONITOR IS 17" SVGA FLAT SCREEN; 1U FLIP UP MONITOR/KEYBOARD/TOUCHPAD OPTIONAL FOR RACK-MOUNTS.<br><br>• CD-ROMs<br><br>• PCMCIA PC-CARD READERS SUPPORTING FORTEZZA® ENCRYPTION DEVICES<br><br>• FLOPPY DRIVE<br><br>• INTERFACE CONTROLLERS<br><br>• PARALLEL PRINTERS<br><br>• KEYBOARD<br><br>• MOUSE OR TOUCHPAD |

FIG. 4

SECURITY POLICIES IN TRUSTED OPERATING SYSTEM

PRIORITY CLAIM

This application is a divisional application of and claims priority from U.S. patent application Ser. No. 10/462,771 filed Jun. 17, 2003, which is hereby incorporated by reference in its entirety, which claims priority from Provisional U.S. Patent Application Ser. No. 60/388,738, filed Jun. 17, 2002, which is hereby incorporated by reference in its entirety.

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of trusted computing systems.

BACKGROUND OF THE INVENTION

Figure 1:
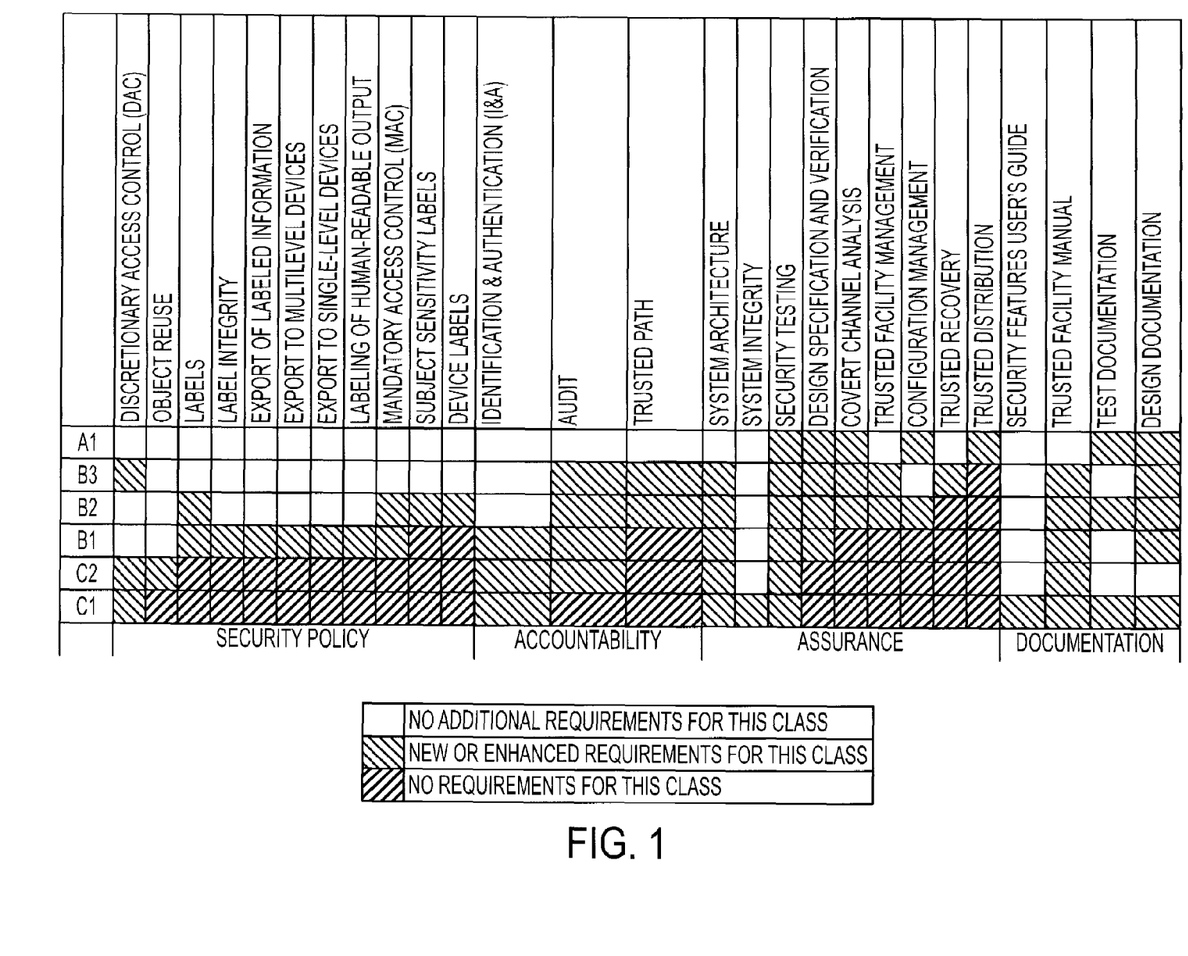
FIG. 1 is a table providing a high-level overview of the requirements to achieve the various TCSEC security classification levels.

The XTS-300™ Trusted Computer System, most recently manufactured by Getronics Government Solutions, LLC of Herndon, Va., has long been the only National Security Agency (NSA) evaluated high-assurance general-purpose computer system. Through careful design, the XTS-300 has been evaluated at the Class B3 level by the NSA according to its Trusted Computer System Evaluation Criteria (TCSEC), the teachings of which are incorporated herein by reference in their entirety. The B3 rating is proof that the system provides a very high level of security functionality. FIG. 1 provides a high-level overview of the requirements to achieve various TCSEC security classification levels. The TCSEC is also known more formally as the United States Department of Defense Standard Number 5200.28-STD, and is often colloquially referred to as the "Orange Book".

Because of the high level of security functionality provided by the XTS-300, it has provided defense, intelligence, diplomatic, law enforcement, and other communities with an extremely secure system running on the latest generation of Intel server-class hardware. In addition, the XTS-300 leverages its commodity hardware architecture to take advantage of frequent hardware advances in the Intel® x86 hardware base and in the SCSI subsystem.

The XTS-300 is used as a platform upon which applications are built that filter data and enforce security policies. Filtering is a process which allows rules-based inspection and selection criteria to be applied to a variety of data, thus allowing approved data, where appropriate, to safely pass from one security classified level to another security classified level. Many of these programs have been called "Guards" because they guard one network from another using hardware enforced protections of the XTS-300 while still allowing selected data to flow through carefully architected and fully accredited logic paths between networks of differing levels.

While the XTS-300 has been successful, the number and nature of the computer software programs which can be run on the XTS-300 is limited by its operating system.

SUMMARY OF THE INVENTION

Accordingly, a preferred embodiment of the present invention is directed to a system and method that substantially obviates one or more of the problems due to limitations and disadvantages of the related art.

It is an object of the present invention to create a trusted operating system comprising an application domain, in which trusted and untrusted applications can be executed; an operating system services layer, wherein the operating system services layer provides interfaces allowing applications written for at least one other operating system to be run in the trusted operating system, whereby the operating system services layer emulates the at least one other operating systems; a trusted system services layer; and a security kernel, for enforcing system security policy and integrity rules, and for providing basic operating system services, including facilitating user and administrator actions.

It is another object of the present invention to create a trusted computer system comprising at least one processor, wherein each of the at least one processors supports a multi-domain architecture; at least one terminal, for facilitating operation of the trusted computer system; at least one data storage unit; at least one memory unit; and a secure operating system running on the trusted computing system, wherein the secure operating system utilizes the multi-domain architecture of the at least one processor to enforce process isolation.

It is yet another object of the present invention to provide a security policy enhancement system, comprising at least one processor, wherein at least one of the at least one processors implements a multi-domain architecture; at least one Random Access Memory unit; a secure operating system, wherein the secure operating system operates at least two different security classification levels, with data existing in each of the security classification levels; and, at least one data security verification means, wherein the data security verification means performs security checks on the content of data to determine if the data can be transferred by the secure operating system from one classification level to another.

It is still another object of the present invention to provide a trusted operating system which emulates another operating system by allowing an application program written for the other operating system to execute on the trusted operating system without requiring changes to the application program.

Another object of the present invention is to create a trusted operating system, capable of concurrently running a plurality of processes, which provides a subtype mechanism wherein the subtype mechanism allows additional access control differentiation beyond mandatory and discretionary access.

Yet another object of the present invention is to implement a trusted operating system wherein four separate policies are enforced whenever any process attempts to access any file system object, the policies comprising a Mandatory Security Policy; a Mandatory Integrity Policy; a Discretionary Access Control Policy; and a Subtype Policy.

Still another object of the present invention is to create a trusted operating system which prevents a first process from learning about the existence or status of a second higher classified process by limiting the number and speed of covert storage channels.

Additional features and advantages of the invention are set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention is preferably a general-purpose computing system in that it can be used for a wide range of applications, from multi-user workstation to trusted guard to trusted server. Although a preferred embodiment of the present invention leverages some of the hardware architecture and operating system kernel design techniques used in the XTS-300, the preferred embodiment of the present invention described herein has been rearchitected to add support for contemporary hardware and a robust set of Linux® Application Programming Interfaces (APIs) and Application Binary Interfaces (ABIs) so that the thousands of programs and commands written for Linux, in their binary form and without porting or recompilation, can be copied and run under the protection of the security architecture implemented in a preferred embodiment of the present invention. Thus, a preferred embodiment of the present invention provides an emulated open source environment where ultra-secure functions can be performed in a trusted manner.

In addition, a preferred embodiment of the present invention allows other, trusted programs to access APIs unique to the present invention, thereby providing access to and, in certain situations, control over some or all security aspects of a preferred embodiment of the present invention. While providing ABI/API compatibility with Linux (i.e. emulating Linux), the present invention is wholly a creation of the inventors and assignee hereto and uses no Linux kernel code. It is therefore a highly secure, Linux-compatible environment enjoying both the freedom to run open source applications and the security associated with a guarded, proprietary system.

A preferred embodiment of the present invention employs an operating system called the Secure Trusted Operating Program (STOP™). Unlike earlier approaches, a preferred embodiment of the present invention is architected to support Linux ABIs/APIs and security enforcing APIs and commands that are unique. This preferably allows the present invention to provide unparalleled security while also permitting the present invention to run more standard, commercially available applications without the need for substantial modifications.

A preferred embodiment of the present invention provides multilevel secure Trusted Security Functions (TSFs), which are to the Common Criteria for Information Technology Security Evaluation approximately what Trusted Computing Base (TCB) was to the TCSEC, that allow simultaneous processing and storage of data at different classifications or sensitivities and needs-to-know (categories/compartments) by users with different clearances and needs-to-know. Unlike systems which operate in system-high mode, which is typically defined as a security mode of operation wherein each user, with direct or indirect access to a specific information system, its peripherals, remote terminals, or remote hosts, has all of the following: (a) valid security clearance for all information within the information system; (b) formal access approval and signed nondisclosure agreements for all the information stored and/or processed (including all compartments, subcompartments and/or special access programs); and (c) valid need-to-know for some of the information contained within the information system, a preferred embodiment of the present invention can eliminate arbitrary over-classifying of data.

A preferred embodiment of the present invention is designed for high robustness and/or high risk environments, which implies not only incorporation of particular security features, but a very high level of assurance. This level of assurance allows a preferred embodiment of the present invention to be accredited to handle data at a wide range of sensitivities (e.g., classification levels) in a wide range of operational environments. The present invention is designed to provide a high level of security while running many kinds of applications, including specialized applications such as network guards or filters for handling the semi- or fully automatic downgrading and/or down flow of information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to preferred embodiments of the present invention, examples of which are illustrated in the accompanying drawings.

The operating system component of a preferred embodiment of the present invention is a multiprogramming operating system that can support terminal connections for multiple users. In a presently preferred embodiment, up to 200 processes can run concurrently, each with up to four gigabytes of virtual memory. The operating system component of the present invention also preferably supports Linux APIs and can run, in a secure environment, most object or binary programs compiled on Linux without requiring modification of such object or binary programs. In addition, the present invention preferably provides an X-Windows graphical user interface (GUI) outside the Trusted Security Functions (TSF), which can be made available at a console for work by untrusted users.

A preferred embodiment of the present invention also permits network connectivity by building TCP/IP and Ethernet protocols (10BaseT/100BaseT) into the TSF, while also supporting the implementation of network servers (e.g., SMTP, HTTP, and the like) outside of the TSF. In an embodiment of the present invention expected to pass Common Criteria evaluation, attachments within the same network must currently be single-level, while multiple networks can each be at different levels.

A preferred embodiment of the present invention implements all currently accessible windows on a given display at the same security level. Although a preferred embodiment of the present invention does not support multi-level cut-and-paste due to security concerns and possible processor overhead, it should be appreciated by one skilled in the art that such functionality can be implemented without departing from the spirit or the scope of the present invention. A preferred embodiment of the present invention implements a trusted path mechanism, preferably implemented as a Secure Attention Key (SAK), for execution of commands at other security levels. Such commands are preferably entered through a trusted command interface. Initiation of the trusted path causes suspension of the GUI, and absolutely isolates the trusted command interface from the GUI environment.

A preferred embodiment of the present invention is based around a combination of a multilevel secure operating system and a customized Intel x86 hardware base. The operating system component of the present invention preferably provides mandatory access control that allows for both a security (MAC) and integrity (MIC) policy. The mandatory security policy enforced by a preferred embodiment of the present invention is reflective of the Bell and LaPadula security model, as described in D. Bell and L. LaPadula; "*Secure computer systems: Mathematical Foundation,*" ESD-TR-73-278, Vol. 1, Mitre Corp, 1973, the teachings of which are incorporated herein by reference in their entirety.

Beyond the minimal requirements for a TCSEC B3 or Common Criteria system, a preferred embodiment of the present invention provides a mandatory integrity policy (which is required by medium- and high-robustness profiles), an extra subtype policy, and a familiar, Linux-like operating environment. By way of example, without intending to limit the present invention, the integrity model of a preferred embodiment of the present invention can be used for advanced virus protection. The mandatory integrity policy is reflective of the Biba integrity model, as described in Biba, K. J., "*Integrity considerations for Secure computer Systems*", ESD-TR 76-372, MITRE Co., April 1977, the teachings of which are incorporated herein by reference in their entirety.

In addition to mandatory access control, a preferred embodiment of the present invention also implements discretionary access control (DAC) and provides user identification and authentication means needed for user ID-based policy enforcement. A preferred embodiment of the present invention provides a policy mechanism, called "subtypes," which can be used in a customer-specific way in conjunction with MAC, MIC, and DAC controls. In this embodiment, each device, process, and file system object has a subtype attribute. Each process has 3 lists of accessible subtypes, one for each the aforementioned device, process and file system object types. In order to access an object of one of those types, a process must have the object's subtype on its own subtype list.

These four mechanisms (DAC, MAC, MIC and Subtype) can be used in various application designer chosen combinations to restrict or permit access to various data objects, processes, devices and the like. A particular file, for example, might be restricted by a selection of these access controls to being changeable only by a process of a certain classification but even beyond that, by only a certain group and even by a certain user.

The TSF exhibits several strong architectural characteristics, including: minimization, layering, abstraction, and data hiding. As used herein, minimization refers to an operating system design technique wherein non-critical non-security functionality is kept apart from the TSF to reduce overall system complexity. This can allow humans to successfully evaluate complex data processing programs and systems. Layering, as used herein, refers to an operating system design technique wherein the TSF employs a modularized design with "layers" used as an organizing principle. This provides clearly defined interfaces, individual layer testing, facilitates a locking hierarchy, and points out the layers of data abstraction, as data which is more abstract would be at higher layers. Abstraction, as used herein, refers to an operating system design technique wherein more complex data structures are built from less complicated ones. Abstraction is used to hide unneeded or undesired details which may be appropriate at one layer of the Operating System from processes or modules which operate within a higher layer. Data hiding, as used herein, refers to an operating system design technique wherein the scope of data is minimized. Data which is hidden is visible to only those modules for which visibility is necessary. Data hiding is used to force the use of abstraction. The TSF makes use of hardware features to provide process separation and TSF isolation and has been designed and implemented to resist penetration. The system design is based on a formal security model and other high-level design documentation.

Figure 3:
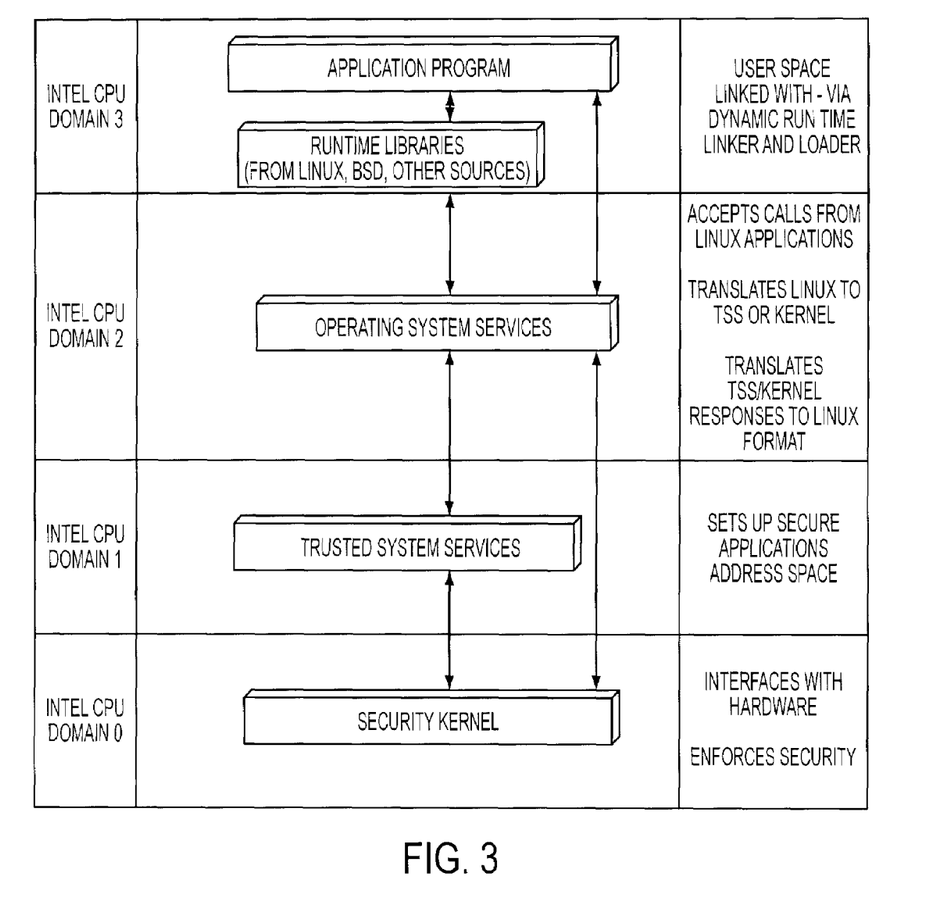
FIG. 3 is a block diagram illustrating the four domain architecture employed in a preferred embodiment of the present invention.

Unlike most modern operating systems, the operating system component of the present invention has preferably been architected around security. Thus, every level of the system, including each database, application, user, terminal, and process, has a level of security associated with it. As illustrated in FIG. 3, the operating system portion of a preferred embodiment of the present invention utilizes an architecture referred to as "rings of isolation" (also referred to as "domains"), in which the inner rings cooperate to provide security functionality, and the outer rings depend on the inner rings for proper functioning.

The multi-domain architecture illustrated in FIG. 3 prevents terminals from simultaneously connecting to processes at different MAC levels. To connect to a process with a different level, a user must first disconnect, or the operating system must disconnect the user, from any processes currently running. The operating system is essentially tamper-proof due to this domain architecture and process isolation. In fact, a preferred embodiment of the present invention is so secure that even processes are restricted by domain privileges, and are allowed to send messages only to those other processes that have the same or lesser domain privileges. All of these conventions are enforced within the system itself. By way of example, without intending to limit the present invention, Domain 0 of FIG. 3, which represents the Security Kernel and which operates at the system's highest level of security, is inaccessible by users. Input/Output device drivers reside at this level, thereby preventing unauthorized access to the device drivers.

In addition to enforcing security using the domain architecture described above, a preferred embodiment of the present invention further separates administrator and operator roles using an integrity policy. The system enforces the "principle of least privilege" (i.e., users should have no more authorization than that required to perform their functions) for administrator and operator roles. All actions performed by privileged (and normal) users can be audited. The audit log is protected from modification using integrity and subtype mechanisms.

The operating system component of a preferred embodiment of the present invention also provides an alarm mechanism to detect any accumulation of events that indicate an imminent violation of the security policy, such as a series of unsuccessful logins or inaccurate passwords. Individual accountability is provided with an auditing capability. Data scavenging is prevented through object reuse (i.e., residual data) prevention mechanisms.

The multilevel security features of a preferred embodiment of the present invention's TSF enforce trusted labeling, a mandatory access control policy, and a mandatory integrity control policy that enable the system to allow users with different clearances and needs-to-know to simultaneously store and process information that exists at different classification levels or sensitivities and/or in different need-to-know categories or compartments. Authorized users can process information at its actual sensitivity level, helping to eliminate the arbitrary over-classification of information that often occurs in system-high operations.

With respect to an embodiment of the present invention deployed or evaluated using the Common Criteria, the present invention is preferably designed to meet EAL5 assurance requirements, with portions of the EAL6 and EAL7 requirements also met. For the most part, these EAL requirements are similar to the Orange Book (i.e., TCSEC) B3 assurance requirements. The security functionality required for B3 is preferably achieved, but the exact set of functional requirements met by a preferred embodiment of the present invention will depend on the protection profiles put forward by customers.

Figure 2:
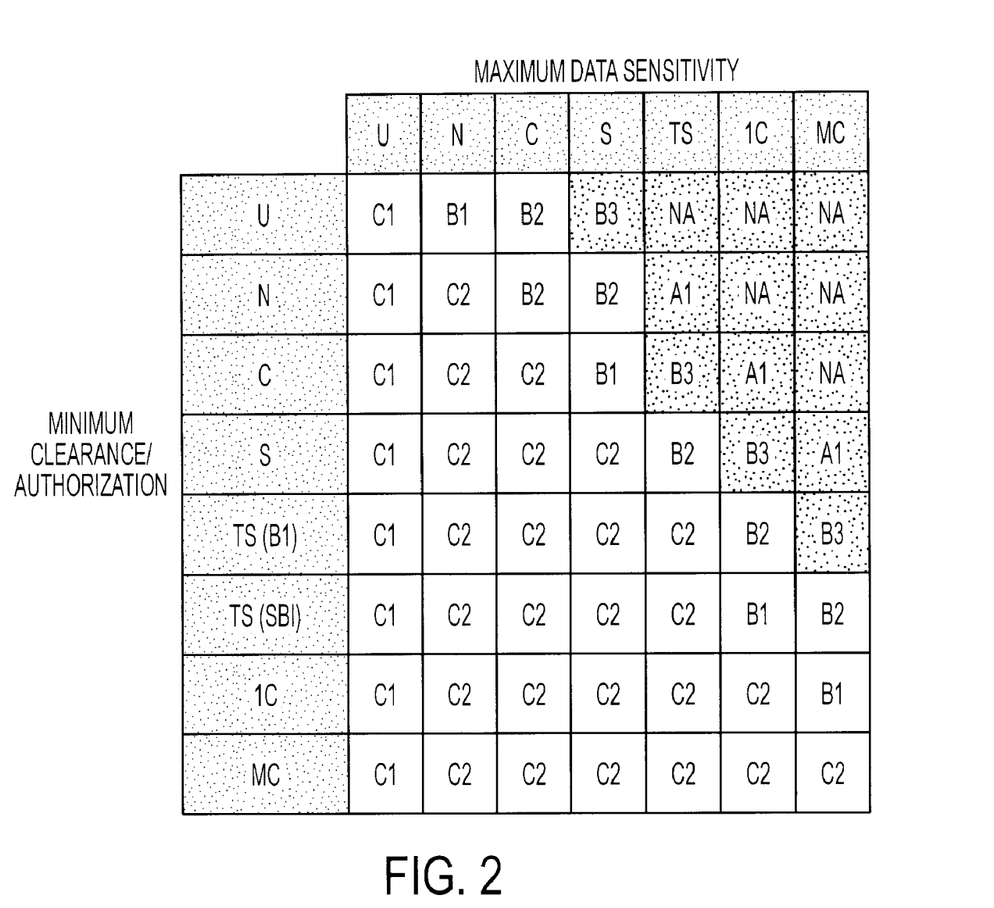
FIG. 2 is a table illustrating the minimum TCSEC rating a system should have to allow users within a given range of authorizations to access data within a given range of classifications.

As illustrated in FIG. 1, a system that is rated as a Class B3 system provides a TCB/TSF that provides the security features required by the TCSEC. The NCSC's *Guidance for Applying the DoD TCSEC in Specific Environments* (known as "The Yellow Book", the teachings of which are incorporated herein by reference in their entirety) includes a "Security Index Matrix for Open Security Environments". By way of clarification, the terms Open and Closed indicate the strictness of security controls in the system's development environment, not its operational environment. FIG. 2 shows the minimum TCSEC rating a system should have to allow users within a given range of authorizations to access data within a given range of classifications.

The wider the range of classifications, the higher the rating the system needs to assure it will protect data. Class B1 systems (e.g., compartmented-mode workstations) provide too little assurance for many multilevel processing scenarios in which data ranges from Unclassified to Secret, or from Secret to Top Secret/SCI compartmented.

The operating system component of the present invention preferably comprises a Trusted Computing Base (TCB) and Trusted Security Functions (TSF), which enforce security policy, and untrusted commands, which generally provide user interfaces familiar to Unix and/or Linux users.

A preferred embodiment of the present invention leverages the Pentium® or Xeon™ CPU's four-domain chip architecture to reinforce the operating system component's mandatory security and integrity access control policies by physically isolating security domains in hardware, thereby preventing system processes from tampering with each other. The multi-domain CPU architecture restricts access to segments, pages, and instructions. As illustrated in FIG. 3, there are four levels: Domain 0 to Domain 3, with Domain 0 being the most privileged level. The CPU also provides multiple checks for protection violations within memory references.

As illustrated in FIG. 3, non-TSF processes and TSF processes are mapped into the multi-domain CPU architecture in the same manner. Both types of processes map to the same Domain 0 Kernel, Domain 1 Trusted System Services, and Domain 2 Operating System Services. More information on the processes in each domain follows.

Domain 0: Security Kernel

The most privileged domain, the Security Kernel contains most of the Reference Monitor that enforces system security policy. Small and well structured to enable complete security evaluation, testing, and verification, the Kernel provides basic OS services. Such services include, but are not limited to, resource management, process scheduling, interrupt and trap handling, auditing, and mandatory and discretionary access policy enforcement for processes and device objects. To facilitate such enforcement, I/O device drivers preferably reside in Domain 0. Domain 0 processes cannot be directly called or modified by users.

Domain 1: Trusted System Services (TSS)

TSS provides networking, I/O, file system management, and file system object discretionary access policy enforcement for both trusted and untrusted system processes and applications. The TSS environment is controlled by the Security Kernel, which enforces mandatory security, mandatory integrity, and subtype control on the TSS and all other operations. Domain 1 processes cannot be directly called or modified by users.

Domain 2: Operating System Services (OSS)

OSS provides APIs expected by applications written for Linux or using Linux tools. OSS also provides proprietary APIs to help manage and use trusted aspects of a preferred embodiment of the present invention. OSS translates the APIs into trusted operating system primitives provided by the Kernel and TSS. OSS also manages some application signals and process groups. Due to the security architecture of a preferred embodiment of the present invention, applications can interface with only the OSS portion of the TSF—they cannot call TSS or the Kernel directly.

Domain 3: Application Domain

If a process is running at low integrity and has no privileges, it is considered untrusted. These untrusted applications include the user commands and tools that are familiar to Linux/Unix users. Both trusted and untrusted applications execute in Domain 3, and can only execute in Domain 3.

Trusted Software

Trusted Software includes all security-relevant functions that operate as independent services (e.g., a security map editor). Some Trusted Software functions may bypass the TSF's mandatory and/or discretionary controls, e.g., to enable high-integrity users to establish/modify the file system hierarchy to accommodate use of high-integrity nodes. Trusted Software functions are available to system operators and administrators for security-related housekeeping, including, but not limited to user registration/removal, password assignment, system installation/configuration, and privileged tasks not supported by other operating system components. A few Trusted Software functions, such as application session start-up, are available to Domain 3 users.

Untrusted Software and Runtime Libraries

Also included as an optional part of a preferred embodiment of the present invention is a Software Development Environment that enables developers to write their own untrusted applications. Typically, "C" is the programming language used for such untrusted applications, although other languages and shells supported by Linux could be used. Untrusted commands and programs are distributed with the operating system for administration of the system.

Trusted Databases

A preferred embodiment of the present invention implements trusted databases which contain sensitive user and group access, session control, and print queue information which is protected from unauthorized modification by unprivileged processes. Trusted databases can be manipulated only by user-developed trusted processes, or trusted editors used by system/security administrators.

Philosophy of Protection

To enforce the mandatory access policies that make a preferred embodiment of the present invention multilevel secure, the operating systems component implements a Reference Monitor. The Reference Monitor enforces authorized access relationships between system subjects such as trusted and untrusted processes acting on a user's behalf to perform accesses, or the like, and system objects, such as file system objects, devices, semaphores, sockets, processes, and the like.

Trusted system subjects are used mainly for functions that manipulate the system's trusted databases or perform strictly controlled circumventions of the TSF's mandatory and/or discretionary access rules. A typical example of a trusted process is a Regrader (reclassifier/relabeller) process in a Trusted Guard. Except for those few processes that must update a trusted database or bypass the operating system component's access controls, untrusted subjects can be relied upon to perform most application functions.

Reference Monitor

A Reference Monitor compares each attempt by a subject to reference, or access, an object against a list of reference types (including read, write, and/or execute) the subject is authorized to perform on that object. The Reference Monitor's access validation mechanism is invoked for every reference by a subject to an object, thus preventing any unauthorized accesses. To ensure its integrity, the Reference Monitor's access control/validation mechanism is programmed to be tamperproof. The Reference Monitor is implemented in the TSF, which derives from the Intel CPU's multi-domain isolation mechanisms the absolute separation of the Reference Monitor from Domain 2 and Domain 3 functions and applications running on the system.

TSF Assurance Mechanisms

All software processes on the present invention are preferably isolated from one another by the Security Kernel's enforcement of the Bell-LaPadula security and Biba integrity rules. Processes may only access information they dominate, and the entire TSF is protected from unauthorized tampering via the following mechanisms:

Domain Isolation

Domain isolation protects code and data in the Kernel from modification by processes in any other Domain and protects the code and data in each Domain from modification by users/processes in any less privileged Domain.

Integrity

The system's mandatory integrity mechanism sets integrity levels of TSF program files, databases, and most trusted software processes to operator or higher and excludes untrusted users (subjects) from the TSF by limiting their maximum integrity to less than that of TSF objects.

Process Isolation

Trusted Software processes (like most applications) keep their working data in process-local data areas that cannot be shared by other processes or accessed by untrusted software. The Kernel prevents any process from directly accessing another process' program text and local data and prevents untrusted processes from modifying trusted processes and their data.

Trusted Path

In a preferred embodiment, before a terminal can communicate with the TSF, the operator must press the Secure Attention Key (SAK), which temporarily disconnects the terminal from any untrusted processor processes. This ensures that the user is communicating with the TSF, not with an untrusted process spoofing a TSF process. Any unlocked terminal used by trusted software is protected from untrusted software and other users' processes by a terminal-unique device subtype. When a user enters the TSF via the secure path, the secure server detaches the terminal's subtype from all untrusted processes associated with the session. Terminal access to untrusted processes is restored only after the user explicitly exits the trusted environment.

Subtypes

Subtypes are used like tokens; to access an object on the system, a subject must possess the object subtype for that object. The system's subtype mechanism is used by the Kernel to restrict access to processes, trusted databases, and devices. As described above, the primary use of subtypes is to provide control over the Trusted Path; when the SAK is pressed, the Server changes the subtype of the terminal to prevent any untrusted process from accessing it. Subtypes are also used by the file system management (FSM) process to assure that FSM gets exclusive access to the file object. When it accesses the file object, FSM resets the subtype to one to which only FSM has access. After it finishes processing the file, FSM resets the file to its original subtype. Finally, subtypes are used to protect the system's trusted databases, by giving only trusted programs the appropriate subtypes needed to access the databases.

Mandatory Security Policy

Each object in a preferred embodiment of the present invention is referenced by a unique identifier, and has its own set of access and status information (including subtypes) to implement non-hierarchical mandatory access controls based on need-to-know, and mandatory and discretionary access attributes. An object's mandatory access information includes its mandatory security and integrity levels and categories or compartments; this information provides the basis on which the Kernel makes mandatory access control decisions related to the object.

Subjects in a preferred embodiment of the present invention can only reference objects according to the NCSC-approved Bell-LaPadula formal mathematical model of computer security policy. This policy is implemented by a set of security rules designed to protect data from unauthorized access. Briefly, the mathematical model operates as follows:

Simple Security: Subject may read or execute object only when subject's security level dominates objects.

Security*Property: Subject may write object only when object's security level dominates subjects. The present invention's Security*Property implementation preferably allows subject to write object only when subject and object are at the same security level. This prevents lower level subjects from writing higher-level objects they cannot later access.

A preferred embodiment of the present invention supports 16 hierarchical security classifications and 64 independent non-hierarchical "need-to-know" security categories/compartments.

Mandatory Integrity Policy

A preferred embodiment of the present invention enforces K. J. Biba's integrity policy, a corollary to the Bell-LaPadula model, which enforces the system's mandatory integrity rules. Just as the system's mandatory security rules protect information from unauthorized disclosure, the system's mandatory integrity rules protect information from unauthorized modification.

The system's mandatory integrity policy enables the security administrator or developer to establish highly protected execution domains in which executables may read the files they need while those files remain protected from modification by unauthorized logic or malicious code. A preferred embodiment of the present invention presently supports 8 hierarchical role-based integrity classifications and 16 independent non-hierarchical need to-know integrity categories/compartments. Briefly, the integrity model operates as follows:

Simple Integrity: Subject may read or execute object (e.g., data file) only when object's integrity level dominates subjects.

Integrity*Property: Subject may write object only when subject's integrity level dominates object's. The present invention's Integrity*Property preferably allows a subject to write an object only when the subject and object integrity levels are the same, preventing higher-integrity subjects from writing lower-integrity objects (which could be considered trustworthy by other software) they cannot later access.

Discretionary Access Controls

The present invention preferably enforces a discretionary access policy whereby access to an object is assigned by the object's owner according to the identity of subjects associated with the object and/or groups to which those subjects belong. An object's discretionary access information includes up to at least 7 user and group identifiers (including the object's owning user and owning group), and their individual read, write, and execute permissions. Read, write and execute permissions are also provided for "world".

Access Modes: Subject may access object in only those mode(s) granted by object's owner. Each object is assigned read, write, execute permissions for object's owner, owner's group(s), members of other groups allowed by owner, and all others ("world" permissions).

The TSF enforces the following series of rules to determine whether a subject should be granted discretionary access to an object:

If subject owns object, use specified owner permissions; if not,

If subject has entry in system's Access Control List, use those permissions; if not, If subject's group is same as object's group, use specified group permissions; if not, If subject's group exists in ACL, use group ACL permissions; if not, Use specified "world" permissions.

Subtype Control

Processes, devices, and file system objects are controlled by subtype in addition to the mandatory and discretionary controls. Subtypes are non-hierarchical. They can employed by trusted applications to separate applications (e.g., such as stages in a guard), even if those applications run with the same owner and at the same mandatory level.

Covert Channel Protection

Systems that enforce a mandatory security policy may still allow unintended signaling channels, or illicit information flows, that are counter to the mandatory security policy. Such signaling channels and illicit flows are commonly known as covert channels. By way of example, without intending to limit the present invention, a classic covert channel is created using the file system, such as by having a malicious process at a low security level attempt to create a file. In such an example, if the file creation attempt is successful, that is deemed equivalent to a "1", and where the file creation attempt fails, that is deemed equivalent to a "0". A high security process can control whether the file creation attempt is successful by filling up the file system or portion thereof. Thus, a string of bits can be effectively communicated from the high security process to the low security process by repeating this sequence over and over, with the high security process removing a file when it wants the low security process's creation attempt to succeed. Such a communications means can be highly effective, and can be used to circumvent mandatory security policies or the like.

Covert channels are generally difficult to use, and low assurance systems are not required to document or reduce them. However, a preferred embodiment of the present invention is designed to be high assurance and to offer protection in highly hostile environments, therefore the present invention preferably incorporates mechanisms to reduce the number and capacity (i.e., speed) of covert channels, and potential covert channels are documented. Mechanisms employed in a preferred embodiment of the present invention which help to protect against covert channel use include, but are not limited to, introducing timing delays and obscuring status values in situations which might be used as a covert channel.

Hardware

Figure 4:
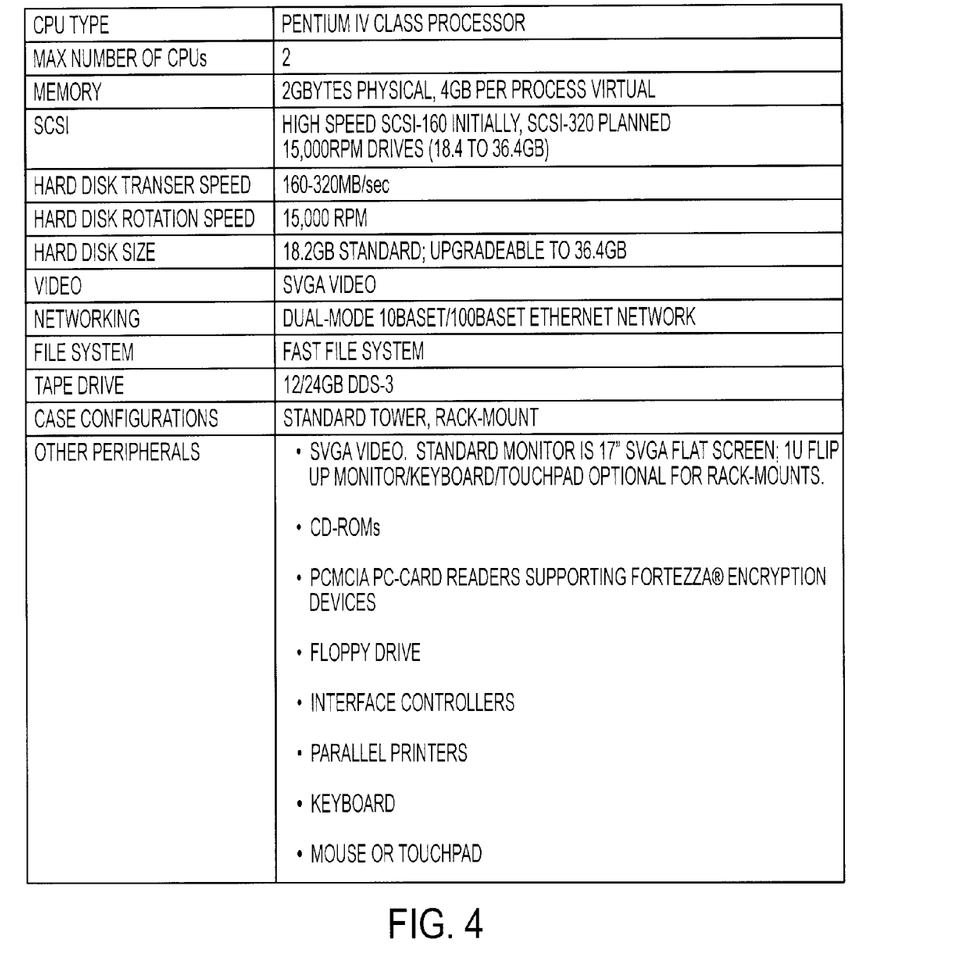
FIG. 4 is a table providing a presently preferred hardware specification for a computer system used as part of a preferred embodiment of the present invention.

A preferred embodiment of the present invention preferably leverages the significant processing power and internal architecture of the Intel "Prestonia" Xeon™ 2+GHz CPUs to improve performance. FIG. 4 provides more detail on a preferred standard hardware configuration of the present invention, including hardware peripherals which the operating system component of a preferred embodiment of the present invention will support.

A preferred embodiment of the present invention can be embodied in tower case or rack mounted configurations, or in high density, TEMPEST, and Zone embodiments. Careful configuration control and testing are applied to assure delivery of a consistent, reliable, and secure product.

Applications

Trusted applications on a previous embodiment of the present invention have significantly aided in the maturation of multilevel security (MLS) to the point where MLS systems are being deployed widely in operational configurations at low risk and with significant payoff. Numerous certification and accreditation efforts have been completed of now-operational Trusted Applications—several developed by applicants—that use the previous embodiment as their high-assurance platform. Many of these applications are Trusted Guards designed to allow the strictly controlled sharing of information among networks operating at different sensitivity levels (e.g., Classifications) and/or "needs-to-know" (categories or compartments).

A preferred embodiment of the present invention can also be designed to be backward compatible with these older trusted applications. However, two "enabling technologies" for building Trusted Guard applications for present invention, the DataSync Guard and the Standard Automated Guard Environment (SAGE), have also been developed.

With the operating system component of a preferred embodiment of the present invention, the development of Trusted Applications is much easier. Applications can be created entirely on "real" Linux systems, created entirely on an embodiment of the present invention implemented as a development system, or created partially on both. In any of these development environments, an entirely new and richer set of rapidly evolving development tools are available to the programmer and designer.

Guard-Enabling Technologies

DataSync Guard

The customizable DataSync Guard™ represents a new generation of Trusted Guard application, the first-ever TCP/IP socket-based High Assurance Guard. The DataSync Guard strictly enforces the security policies governing the connection-oriented transfer of data between systems that reside on separate system-high networks at different classification (or sensitivity) levels. The DataSync Guard achieves near-real-time data transfers. Originally conceived to enable the reliable synchronization of databases operating at different sensitivity levels, the DataSync Guard is communications protocol independent, and can handle ASCII, HTML, XML, well-formed binary and other data flowing between any two systems that can transfer their data over socket connections to the Guard.

By replacing "store and forward" file transfer protocols with TCP/IP sockets as its data transfer mechanism, and performing most of its processing in RAM which eliminates the need to write to or read from disk or resynchronize the file system each time data are passed from one Guard subroutine to another, the DataSync Guard reduces the latency delay of transactions during data throughput.

In a presently preferred embodiment, the DataSync Guard can support complex filter profiles to mediate data transfers among databases on up to four different single-level system-high networks. The DataSync Guard can filter ASCII and/or well-formed binary data, checking both the correct formatting of the header of the database transaction, and performing security checks on the content of each data element. The DataSync Guard can implement multiple "if-then-else" actions and sophisticated dirty word/clean word searches.

Standard Automated Guard Environment

The Standard Automated Guard Environment (SAGE™) is a set of design concepts, interface definitions, executable code, and accreditation documentation. SAGE is a development environment for building connectionless (store-and-forward) Trusted Guards, alternatively referred to as trusted gateways.

SAGE minimizes the coding required to implement Trusted Guards by providing the common elements (processes, libraries, etc.) that most Guards require. SAGE eases certification and accreditation of these Guards by minimizing the Guard's TSSF. SAGE provides a well-structured framework within which programmers can build Trusted Guard applications more quickly and easily than developing those applications "from scratch". The general objective of a SAGE Guard is to securely, automatically, and efficiently allow a restricted flow of data between two systems or networks with different security characteristics. While the security policy can be customized by the Guard developer, SAGE has been designed to accurately enforce that policy and to protect data from unauthorized disclosure or modification while the data resides on a preferred embodiment of the present invention.

SAGE has been developed in standard ANSI C and documented using trusted software principles to ease the burden of accreditation. Several SAGE guards have already been accredited, including guards for the United States Department of Defense, the United States State Department, and the United States Air Force.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. Computer program product stored on tangible computer readable media, the computer program product, when executed by a computer, providing:
a trusted operating system, the trusted operating system causing the computer to enforce four separate policies in the computer whenever any process attempts to access a file system object accessible by the computer, the enforcing preventing at least one of an unauthorized user and an unauthorized process from accessing the file system object, the policies comprising:
a mandatory security policy;
a mandatory integrity policy;
a discretionary access control policy; and,
a subtype policy.

2. The computer program product of claim 1, wherein:
the discretionary access policy provides discretionary access information for a file system object, the discretionary access information comprising read permissions, write permissions, and execute permissions; and,
the enforcing further comprising preventing at least one of an unauthorized user and an unauthorized process from accessing the file system object according to the discretionary access information.

3. The computer program product of claim 1, wherein:
the subtype policy further comprising providing subtype information for a file system object; and,
the enforcing further comprising preventing at least one of an unauthorized user and an unauthorized process from accessing the file system object according to the subtype information.

4. The computer program product of claim 1, the trusted operating system further comprising covert channel protection, the covert channel protection preventing at least one of unintended signaling channels and illicit information flows.

5. The computer program product of claim 1, wherein:
the mandatory security policy provides at least one of a hierarchical security classification and an independent security category for each file system object; and,
the enforcing further comprising preventing at least one of an unauthorized user and an unauthorized process from reading from the file system objects according to at least one of the hierarchical security classification and the independent security category for the accessed file system object.

6. The computer program product of claim 5, the hierarchical security classification further comprising at least two security levels, each security level being authorized to access the security levels below it.

7. The computer program product of claim 1, wherein:
the mandatory integrity policy provides at least one of a hierarchical security classification and an independent security category for each file system object; and,
the enforcing further comprising preventing at least one of an unauthorized user and an unauthorized process from writing to the file system objects according to at least one of the hierarchical security classification and the independent security category for the accessed file system object.

8. The computer program product of claim 7, the hierarchical security classification further comprising at least two security levels, each security level being authorized to access the security levels below it.

9. The computer program product of claim 1, wherein the computer comprises at least one processor having a multi-domain architecture to physically isolate domains in the at least one processor, and the trusted operating system utilizes the domains isolated by the multi-domain architecture of the at least one processor to enforce process isolation.

10. The computer program product of claim 9, wherein at least the mandatory security policy and the mandatory integrity policy are enforced by a domain physically isolated from a domain providing operating system services or running untrusted processes.

11. Computer program product stored on tangible computer readable media, the computer program product, when executed by a computer, providing:

a trusted operating system, the trusted operating system causing the computer to enforce four separate policies in the computer whenever any process attempts to access a file system object accessible by the computer, the enforcing preventing at least one of an unauthorized user and an unauthorized process from accessing the file system object, the policies comprising:

a mandatory security policy, wherein the mandatory security policy provides at least one of a hierarchical security classification and an independent security category for each file system object; and, the enforcing further comprising preventing at least one of an unauthorized user and an unauthorized process from reading from the file system objects according to at least one of the hierarchical security classification and the independent security category for the accessed file system object;

a mandatory integrity policy, wherein the mandatory integrity policy provides at least one of a hierarchical security classification and an independent security category for each file system object; and, the enforcing further comprising preventing at least one of an unauthorized user and an unauthorized process from writing to the file system objects according to at least one of the hierarchical security classification and the independent security category for the accessed file system object;

a discretionary access control policy; and, a subtype policy.

12. The computer program product of claim 11, the hierarchical security classification further comprising at least two security levels, each security level being authorized to access the security levels below it.

13. The computer program product of claim 11, wherein:

the discretionary access policy provides discretionary access information for a file system object, the discretionary access information comprising read permissions, write permissions, and execute permissions; and, the enforcing further comprising preventing at least one of an unauthorized user and an unauthorized process from accessing the file system object according to the discretionary access information.

14. The computer program product of claim 11, wherein:

the subtype policy further comprising providing subtype information for a file system object; and, the enforcing further comprising preventing at least one of an unauthorized user and an unauthorized process from accessing the file system object according to the subtype information.

15. The computer program product of claim 11, the trusted operating system further comprising coven channel protection, the covert channel protection preventing at least one of unintended signaling channels and illicit information flows.

16. The computer program product of claim 11, wherein the computer comprises at least one processor having a multi-domain architecture to physically isolate domains in the at least one processor, and the trusted operating system utilizes the domains isolated by the multi-domain architecture of the at least one processor to enforce process isolation.

17. The computer program product of claim 16, wherein at least the mandatory security policy and the mandatory integrity policy are enforced by a domain physically isolated from a domain providing operating system services or running untrusted processes.

* * * * *